D. R. ALLEN.
Cultivator.
No. 62,385.
Patented Feb. 26, 1867.
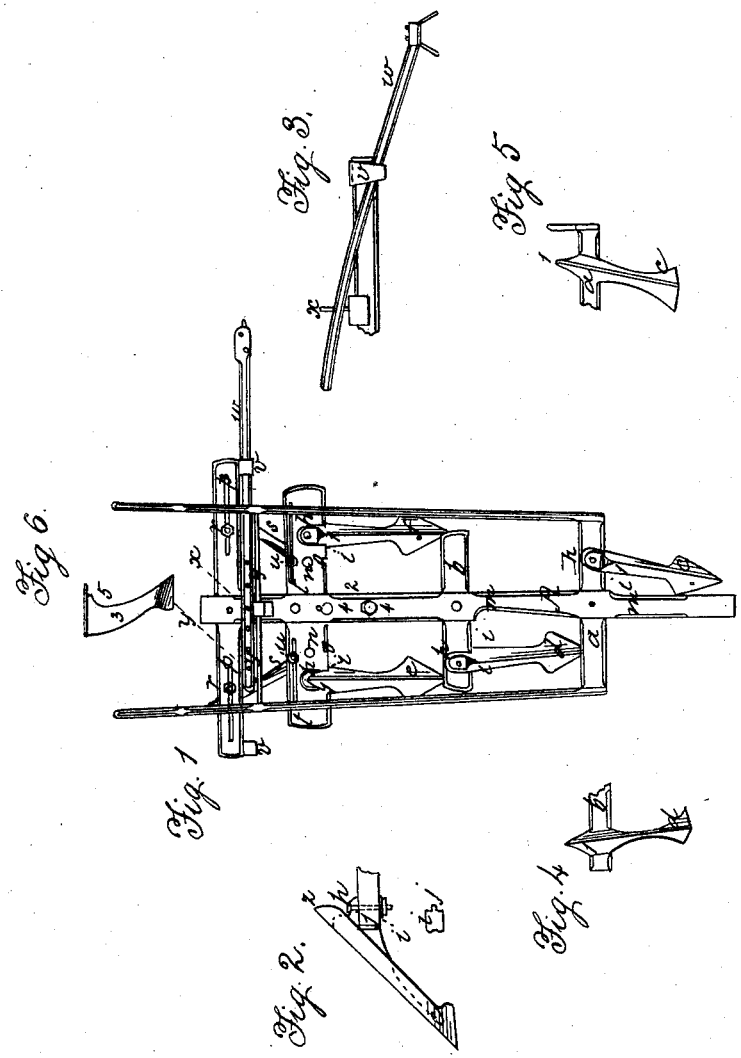
Witnesses
William Henry Clifford
Henry C. Houston.
Inventor:
Daniel R. Allen

United States Patent Office.

DANIEL R. ALLEN, OF CUMBERLAND, MAINE.

*Letters Patent No. 62,385, dated February 26, 1867.*

IMPROVEMENT IN CULTIVATORS.

*The Schedule referred to in these Letters Patent and making part of the same.*

TO ALL WHOM IT MAY CONCERN:

Be it known that I, DANIEL R. ALLEN, of Cumberland, in the county of Cumberland, and State of Maine, have invented certain new and useful Improvements in Cultivators; and I hereby declare the following to be a full, clear, and exact description thereof, which will enable others to make and use my invention, reference being had to the accompanying drawings, forming part of this specification, in which—

Figure 1 shows a top plan and view of a cultivator embodying my improvements.

Figure 2, a detail, embodying a side view of a tooth, and showing the manner in which it is secured to the cross-bar of a cultivator.

Figure 3, another detail, showing a front view of the scorer or measure, and the method of its attachment.

Figure 4 a detailed front view of the tooth on the second cross-bar.

Figure 5, a detached view of the tooth on the first bar.

Figure 6 shows a side elevation of the tooth attached on the under side of the main beam.

Same letters show like parts in each of the figures.

My invention has relation to several different parts of a cultivator, which parts subserve different purposes, and consists in improvements thereupon, which parts and improvements I will now proceed to enumerate and describe. A common and important difficulty with agricultural implements of this kind is, that in soil where the application of them is most needed, to wit, in clogging or weedy ground, the cultivator becomes, by use, loaded and clogged, so that it must be frequently tipped or shaken, to detach from it the turf, weeds, and clods that thus adhere to it, and impair its efficacy. Numerous inventions have been made to meet this difficulty; and to meet it, also, is one purpose of my invention.

Let $a$ show the front cross-bar, and $b$ the second. Upon the front cross-bar, near one end thereof, is secured the tooth $c$. Upon the opposite side of the main beam, and on the second cross-bar, is secured the tooth $d$. On the third cross-bar, near the ends thereof, are secured two other teeth, $e$ and $f$. These teeth are secured to their respective bars as follows: The parts of the teeth that come in contact with the bars consist of a lip, a shoulder, and a flange. The lip projects over and rests upon the top of the cross-bar, and is represented at $h$. The shoulder rests against the forward edge of the cross-bar, and is seen at $i$. The flange is in the middle of the shoulder, and sets into a slot constructed on the forward edge of the cross-bar. This is illustrated at $j$. Through the lip and cross-bar passes a screw, secured by a nut on the under side of the cross-bar. By the combination of these devices the tooth is held in its position. The slots which receive the flanges of the two teeth, $d$ and $c$, are the same, in the mode of their construction, upon the several cross-bars, as those which receive the flanges on the teeth $e$ and $f$; but the shoulders on the teeth $c$ and $d$ are differently made from those on the remaining two teeth. One-half of the shoulder, to wit, the half toward the centre or main beam of the cultivator, is cut in somewhat deeper than that part of the shoulder on the other side of the flange. The result of this is, when the two forward teeth are adjusted to their respective cross-bars, that their lower ends or points converge, so that if they were placed upon the same bar, at the same distance apart as they are placed on their respective bars, the lower ends or points would touch, or nearly so. This is clearly illustrated in the drawings, where it will be seen that the upper ends of the two teeth, $c$ and $d$, are wider apart than their lower ends or points. The object of this arrangement is as follows: to enable the two forward teeth to loosen all the earth passed over by them in the progress of the cultivator, and yet be sufficiently separated at their upper ends, and sufficiently removed from the centre beam A, to prevent the accumulation of weeds and clods on and under the frame of the cultivator. The two remaining teeth, $e$ and $f$, are arranged in planes, which are at right angles to the cross-bar to which the two teeth are attached. The teeth are constructed, moreover, with long stems or shanks, and sharp on their forward edges, but wide enough to give them sufficient strength. Cultivators, when used in weedy or hard and dense soil, have heretofore been found to accumulate, around the teeth and the frame to which they are attached, masses of mingled weeds, turf, and soil, so that, after being used for a certain time, the work must be suspended until the implement can be cleared, freed, and cleaned from the adhering substances. Owing to the arrangement of the teeth in my invention this liability is lessened in a great degree. To give more room between the two forward teeth and the main beam A, the beam is scooped or cut out somewhat opposite the inner sides of these teeth, as shown at $m$. This gives larger room for the passage of any adherent substances upon the inner side of these teeth, and over the bars to which they are attached. Two or more slots are made for the reception of the flanges on the teeth $e$ and $f$, and corresponding holes for the reception of the bolt by which they are secured. (See $n$, $o$.) By this means the space between the two teeth, $e$ and $f$, can be increased or diminished, as the circumstances under which the implement is used may require. The teeth, thus arranged relatively to each other, will loosen every particle of the soil passed over by the cultivator. and are still so. separated as to be free from any danger of clogging. The implement thus constructed can be used to loosen and pulverize the soil, and prepare it for the reception of the seed. Upon the rear end of the main beam A is attached a fourth cross-beam. This cross-beam has two slots, $p\ p$, in which work bolts $r\ r$. On the under side of this cross-bar, immediately underneath the two slots, work two slides, which are held closely up against the under side of the bar by means of the bolts $r$, before described, each having a screw and nut. These slides are each attached to mould-boards $s\ s$. A similar arrangement of slots, bolts, and slides is made in and under the third cross-bar, the slots being shown at $t$, and these two other slides are attached to the mould-boards in the same manner as those previously described. By this arrangement and combination the two mould-boards $s\ s$ can be brought nearer together or placed wider apart, and held at any desired point. This is effected by loosening the nuts upon the bolts $r\ r$ and $u\ u$, so that the bolts can be moved in the slots $p$ and $t$, and then retained by means of the nuts. With this attachment, to wit, the mould-boards and slides, as before described, my invention can be employed, not only to loosen and turn up the soil between rows of grain and other products, but also, by means of the mould-boards $s\ s$, to throw the loosened earth around the roots of growing grain, etc., and thus to subserve the purpose of hoeing. Upon the hindmost cross-bar, and on its forward edge, are set the hooks $v$. These are intended to aid in retaining in position the scorer or marker $w$. This marker consists of a rod, having upon the under side of its outer end two projecting points, which are intended to rest upon the earth and mark two lines as the cultivator passes across the field. The scorer is further secured to the cultivator by having holes $y$, through which passes the pin $x$, and by means of which the distance at which it projects beyond the side of the cultivator can be regulated. The use of this scorer or marker is to indicate the path in which the animal drawing the cultivator shall walk, in order that the furrows made by the implement may be straight and parallel. At each return across the field the marker must be changed in position from one to the other side of the cultivator. The teeth of the cultivator, as to that part which passes through the soil, can be made of the materials customarily used for such purpose. $e$ shows a tooth, constructed in a different manner, which is as follows: an inner part, constructed of any metal useful for the purpose, and having an outer casing or armor of steel, indicated at $z$. By the method of attaching the teeth to the bars, before described, sufficient strength is obtained, and at the same time the implement can be made much lighter than in the ordinary forms. The mould-boards $s\ s$ can be entirely removed from the cultivator in the manner indicated, when not required for use.

I do not claim the formation of the teeth; neither do I claim the arrangement of the cross-bars or the beam of the cultivator frame; neither do I claim the mould-boards $s\ s$; neither do I claim any particular number of teeth. Reference to the drawings will show that if any substance like turf, for instance, is caught on the forward edge of the teeth, and, by successive accumulations of such substances, is pushed upward toward the upper end of the tooth or teeth, there is no projecting point to deliver such substance, but, that rising upon the edge of the tooth, as aforesaid, it will finally pass over the rounded top 1 of the tooth, and then fall to the ground. Clogging is thus prevented by this form of construction. Upon the under side of the main beam A, at 2, is attached the tooth 3 by means of the bolts 4. This tooth prevents the accumulation of weeds, etc., thereupon, by means of the concavity 5 on its front edge, by reason of their falling when pushed up to that part of the tooth. I do not claim the method of attachment of this tooth nor any part of it, except the concave formation of the upper part of the forward edge. An additional use for the mould-boards, which my invention contemplates, is to make furrows for the reception of seed, and then to cover the same. A slot is made in each of the slides attached to the mould-boards, by means of which the flare of these boards can be regulated in order to make a furrow of the desired width. But what I do claim, and desire to secure by Letters Patent, is—

1. The relative arrangement and position of the teeth $c$ and $d$, viz, upon their respective cross-bars $a$ and $b$, converging at their lower ends, in the manner and for the purposes described.

2. The combination and arrangement of the slots and holes in the cross-bars, the shoulder, flange, and lip on the teeth, with the bolt and nut, for the purpose of securing the teeth.

3. In combination with the shoulder, lip, and flange on the teeth, the additional slots and holes in the third cross-bar, for the purpose of rendering the teeth $e$ and $f$ adjustable, as described.

4. The combination of the slots $p$ and $t$, bolts $r$ and $u$, and nuts, with the slides secured to the mould-boards $s\ s$, for the purpose of rendering the mould-boards adjustable, as described.

5. In combination with the diverging upper ends of the teeth $c$ and $d$, the scooped parts $m\ m$ of the beam A, in the manner and for the purposes set forth.

6. The combination and arrangement of the scorer $w$, constructed as described, with the hooks $v$ and pin $x$.

7. In combination with the subject of the first and fifth claims, the rounded top 1 of the teeth projecting above the frame of the cultivator, as and for the purposes specified.

8. The concave shape to the upper part of the forward edge of the tooth 3, when the said tooth is attached as described, for the purposes specified.

DANIEL R. ALLEN.

Witnesses:
  WILLIAM HENRY CLIFFORD,
  HENRY C. HOUSTON.